United States Patent
Henrickson et al.

(10) Patent No.: US 6,625,622 B1
(45) Date of Patent: Sep. 23, 2003

(54) APPARATUS AND METHOD FOR TRANSFERING INFORMATION BETWEEN PLATFORMS

(75) Inventors: David Henrickson, Miami, FL (US); Eiko Eisen, Miami Lakes, FL (US)

(73) Assignee: Eisenworld, Inc., Sunrise, FL (US)

( * ) Notice: Subject to any disclaimer, the term of this patent is extended or adjusted under 35 U.S.C. 154(b) by 0 days.

(21) Appl. No.: 09/378,999

(22) Filed: Aug. 23, 1999

Related U.S. Application Data

(60) Provisional application No. 60/134,224, filed on May 14, 1999.

(51) Int. Cl.[7] .............................................. G06F 17/30
(52) U.S. Cl. ...................................... 707/204; 717/169
(58) Field of Search ................................ 707/200, 201, 707/203, 103, 204, 10; 713/1; 709/220, 221, 222; 717/169

(56) References Cited

U.S. PATENT DOCUMENTS

| | | | | |
|---|---|---|---|---|
| 5,155,847 A | * | 10/1992 | Kirouac et al. | 709/201 |
| 5,499,357 A | * | 3/1996 | Sonty et al. | 707/10 |
| 5,564,051 A | * | 10/1996 | Halliwell et al. | 707/200 |
| 5,642,505 A | * | 6/1997 | Fushimi | 707/204 |
| 5,680,609 A | * | 10/1997 | Reinhardt | 707/10 |
| 5,708,828 A | * | 1/1998 | Coleman | 707/523 |
| 5,710,922 A | * | 1/1998 | Alley et al. | 707/201 |
| 5,832,274 A | * | 11/1998 | Cutler et al. | 717/171 |
| 5,875,327 A | * | 2/1999 | Brandt et al. | 713/1 |
| 5,974,563 A | * | 10/1999 | Beeler, Jr. | 714/5 |
| 6,182,212 B1 | * | 1/2001 | Atkins et al. | 713/1 |
| 6,209,089 B1 | * | 3/2001 | Selitrennikoff et al. | 713/2 |
| 6,243,705 B1 | * | 6/2001 | Kucala | 707/10 |
| 6,301,612 B1 | * | 10/2001 | Selitrennikoff et al. | 709/220 |

FOREIGN PATENT DOCUMENTS

EP 0 841 615 5/1998

OTHER PUBLICATIONS

John Clyman, Migration Utilities, Jun. 11, 2002, PC Magazine, http://:www.pcmag.com/print_article, pp. 1–3.*

* cited by examiner

*Primary Examiner*—Greta Robinson
(74) *Attorney, Agent, or Firm*—Gregory P. Gadson

(57) ABSTRACT

A method and apparatus for relocating application programs, settings, menus, files and documents from a source computer to a target computer. The method and apparatus function properly regardless of whether the source and target computers have the same hardware or operating system. The method includes scanning the source and target machines for all applications programs, settings, menus, files, and documents in order to create a relocation strategy. The relocation strategy is created in view of pre-programmed selection rules or selection rules created by the user. The strategy is then implemented by copying, replacing or merging data from the source machine to the target machine.

9 Claims, 8 Drawing Sheets

APPARATUS AND METHOD FOR TRANSFERING INFORMATION BETWEEN PLATFORMS

The present application is a continuation of provisional application 60/134,224, filed May 14,1999.

BACKGROUND OF THE INVENTION

A. Field of the Invention

The present invention relates to an apparatus and method for intelligently and accurately relocating applications, settings, menus, and data files from a source machine to a target machine.

B. Description of the Prior Art

For various reasons, computer users have found it necessary to move from one computer system to another. The most common reasons for attempting such a move is the purchase of a new computer. Regardless of the reason for the move, the user is likely to want to bring a great deal of the information stored on the old computer to the new one. That information would include, at least, many of the documents created during the user's tenure on the old computer.

One method of moving documents from computer to computer involves saving the documents on a diskette at a source computer and physically moving the diskette to the target computer for saving thereon. Even if the user were to select only important documents for the move, the selected files might not fit on the diskette. This process, therefore, would become tedious if not impracticable for a user lacking sufficient experience in "disk-spanning." Further, as the number of files to be moved increases so does the difficulty in completing the process.

A second method for relocating the files from a source to target computer utilizes a tape backup unit or other high capacity removable storage device in place of the diskette of the first example. The problem of large file size and some of the complexity of the move noted with respect to the first method is obviated through the use of such a storage device. This method, however, requires that both machines have compatible backup units installed.

A third method for relocating files involves the use of a file transfer program. Examples of such programs include pcAnywhere32, LapLink, and FastMove! For machines connected to a network, these programs can be used to electronically transfer files from one computer to another.

All three of these approaches may cope with the relatively simple problem of transferring data files from computer to computer, however, most users want not only to transfer selected data files, but also programs, settings and menus. It would be difficult if not impossible for the average user to transfer these types of files using any of the above methods.

As an example of the problems that would result from trying to use one of the above file transfer schemes to relocate these file types, were a user to attempt to transfer an application directory from a source computer to a target computer, the applications would not be found anywhere in the Windows Start Menu or on the desktop. As these are the locations from which a user would attempt to start the application, the data would exist on the computer but remain functionally unusable. Further, were the user to locate the application, there is little likelihood that it would run. This inability to function properly is due to the reliance of most applications on a number of shared system files called Dynamic Linked Libraries (dlls). While the transfer method may have relocated the application file from the one computer to another, any number of files necessary for the proper functioning of the program could have been left behind on the old computer.

Further, the customizations and settings that were added to each application over time by the user would also likely be left behind during the transfer. While this would not stop an application from running, the expense in time and effort in re-entering, for example, Internet and e-mail settings, re-registering a user's name, address, telephone number, product id/software key, etc., would again render the use of the above file transfer methods undesirable.

Another technique for relocating files from one computer to another involves the physical relocation of the hard disk drive from the source computer to the target computer. The older drive, however, is likely to possess a slower access time and diminished storage capacity relative to the drive of the newer computer. Further, the older computer may not have lost all usefulness, as it might be kept as a backup computer or transferred to another user.

A final prior art solution to the file relocation problem involves the use of programs that are designed to attempt to indiscriminately copy absolutely every file from the old system to the new one. Most of the conventional hard disk copying methods are unable to produce a copy of every file on the drive, as several critical files resist copying because they are in use. Further one or more of the files that are copied to the target system may leave that system in an unstable state. Examples of programs that copy/duplicate entire disk drives from one machine to another bit for bit include Drive Image Pro, DiskClone, DriveCopy and GHOST.

The hard drive duplication programs operate well, however, if and only if the machines are nearly identical. The indiscriminate copying that is utilized by the duplication programs will result in the duplicated operating system having already been configured to function with the hardware of the source computer. The programs of the target computer, therefore, will fail to recognize the hardware in the target machine. The user would then have to go through the laborious process of configuring the programs on the target computer to accept the new hardware. Worse, the differences between the computer programs may result in the halting of the target computer requiring re-installation on the target computer.

As noted above, the optimal use of disk duplication requires that the source and target computer be nearly identical. The most likely reason for the user to move from one computer to another, however, is that the user has decided to upgrade to a newer/faster machine. Specifically, the older computer may have been inadequate to support the new hardware features that became available following its purchase, such as a universal serial bus (USB), digital video disk (DVD), etc. Further, the newer system may have come equipped with newer versions of programs such as an upgraded operating system. By indiscriminately copying all of the programs on the source computer to the target computer, the user would in effect be rendering useless much that he or she would like to have kept on the target machine.

SUMMARY OF THE INVENTION

The objects of the invention are to provide an efficient procedure for permitting a user to relocate all application programs, settings, menus, files and documents from a source machine to a target machine.

To achieve the objects and in accordance with the purpose of the invention, as embodied and broadly described herein, the invention comprises a computer program for performing a file transfer between a source computer and a target computer. The program performs a method comprising, aiding a user in completing a connection between the source computer and target computer, comparing stored information from the source computer to stored information from the target computer for selecting a subset of the information for transfer from the source computer to the target computer, and transferring the selected information from the source computer to the target computer.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

DESCRIPTION OF THE PREFERRED EMBODIMENT

Reference will now be made in detail to the present preferred embodiment of the invention, an example of which is illustrated in the accompanying drawings. Wherever possible, the same reference numbers will be used throughout the drawings to refer to the same or like parts or steps.

Figure 1:
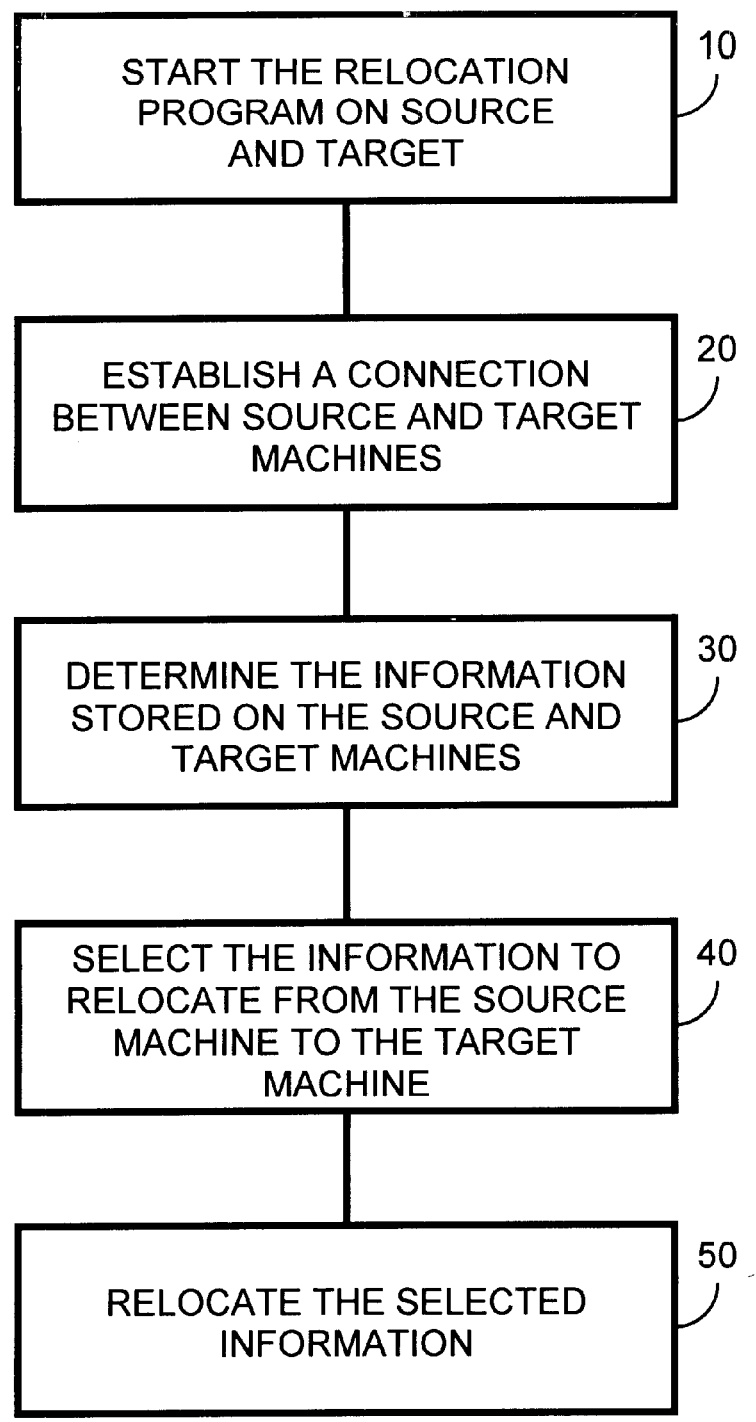
FIG. 1 is a flowchart of an overview of exemplary steps in a first embodiment of a file relocation process.

FIG. 1 shows exemplary steps in a relocation process in accordance with the present invention. The relocation process is performed by a relocation program. In a first arrangement, the relocation process can be controlled by a single relocation program stored on either the target or source machines. Alternatively, the relocation program can be stored on both target and source machines, wherein the programs perform in concert to complete the relocation process. This is called the dual control format. In another alternative arrangement, sub-programs, each individually designed to operate either on the target or source machine, act together to perform the relocation process. This is called the sub-program format.

The first step in the relocation process of FIG. 1 is to start the relocation program (step 10). In the dual control format this step requires starting the program on both of the machines. In the sub-program format this step requires starting each of the subprograms on its designated machine.

The second step in the relocation process is to establish a connection between the source and target machines (step 20). The connection is used to transfer electronic information from the source computer to the target computer. Exemplary connection types include a local area network (LAN) or wide area network (e.g., the Internet) to which both computers are connected. Alternatively, the two computers can be directly connected via a serial port, parallel port, or universal serial bus (USB). In these connection types, a cable is used to physically connect the two machines. Methods of making these connections are well known in the art and will not be described here in detail. The above listed connection types are considered exemplary in nature, other known methods of transferring information between platforms are not mentioned individually, but are considered to be within the scope of the invention.

The third step in the relocation process is to determine the items stored on the source and target machines (step 30). Such a determination can be performed by scanning the hard drives of both the source and target machines. In the single control format, the relocation program on either the source or target machine directly scans its own hard drive to create a list of the items stored thereon and scans the hard drive of the other computer via the connection to create a list of the programs stored thereon. In dual control and sub-program control formats, the relocation program or sub-program stored on each machine performs a scan of the hard drive of that machine to create a list of the items stored thereon. The resulting list of items includes such information about each item as its name, existence, version number, date, size, and content.

The fourth step in the relocation process is to select the information to be relocated from the source machine to the target machine (step 40). This step is explained here as a single selection step, however, preferably, this step includes two sub-steps, a first substep of developing a relocation plan and second substep of finalizing the relocation plan. The term information is intended to include not only individual items, but also selected data stored within those items. The list of items on the source machine is reviewed (the review process is discussed below) to set an action to be taken with respect to that item. The possible actions include no action, copy, replace, and merge. No action is selected when the item on the source machine is not to be relocated to the target machine. Copy is selected when a copy of the item is to be relocated from the source machine to the target machine. Replace is selected when the item is to be written over a preexisting version of the item on the target machine. Merge is selected when it is determined that a subset of the information within a item is to replace its counterpart information within a item on the target machine while leaving some of the information in that item unchanged.

The method by which it is determined which action is to be taken with respect to a specific item can be performed in a number of alternative arrangements. The first form of information selection is called a rules driven process. In this process, the relocation program applies selection rules to each item. A selection rule is defined as a pre-programmed logical rule used to compare specific characteristics stored in the list of items on each machine. An exemplary use of a selection rule resulting in the copy function is: if item A exists on source and not on target then set item to "copy." An exemplary use of a selection rule resulting in no action is: if version number of item A on source is lower than version number of item A on target, then set item to "no action." An exemplary use of a selection rule resulting in the replace function is: if version number of item A on source is higher than version number of item A on target, then set item to "replace." For items having no version number, the date of the item can be substituted in the comparison for the version number. For items having neither a date nor a version number a default selection rule can be used. An example of a default selection rule is: select the item from the machine having the newer operating system.

The merge function discussed above is a special function that parses out data within certain kinds of items, wherein some of the data is replaced onto the target machine and some is left unchanged. The merge function is used for menu and settings files on a source machine having counterpart files on the target machine. The determination of which data to transfer and which to leave unchanged from a setting file is made in view of whether the setting relates to hardware settings, user specific settings, or software specific settings. Hardware settings such as the designation of the modem, printer, monitor, etc., are unlikely to remain the same on the target machine as on the source machine. Such settings, therefore, will not generally be transferred during the relocation process. User specific settings such as Internet bookmarks, e-mail settings, name, address, telephone number, however, will be merged into the counterpart files on the target machine during the relocation process. A third type of settings information is software specific, such as the product ID of an application. This type of setting will be transferred only if the application is also transferred. If the application on the target machine is to be retained, then no action is taken with respect to software specific information.

A second type of selection process is called the database driven selection process. Here, the relocation program is pre-programmed to include a database of actions to be taken with respect to individual known applications. The database is the result of experimentation by the programmers of the relocation program to select preferred actions to be taken with respect to a specific versions of each application.

Finally, a third type of selection process is called the repository selection process. This process operates using both rules and a repository database and is the presently preferred embodiment of the selection process. For this selection process, rules are applied to each application, setting, menu, and data file. For those that are exceptions or special cases (the determination that a specific program is an exception or a special case is made by having previously performed a relocation of that version of the program and analyzing the outcome), an entry is made in a pre-programmed repository database. Entries in the repository database preempt the usual rule result to perform a different action with respect to the specified information. Examples of such a repository database entry are: do not transfer "swap" file, or if transferring application A, items X, Y, and Z must be transferred regardless of the version of items X, Y, and Z.

Because new versions of programs are continually released, it is necessary that the repository database information discussed above can be updated using extension files. Further, rules can be altered and updated by adding scripts to the relocation program. Both forms of updates can preferably be performed using the same extension file.

In an alternative arrangement, a version of a repository database called an automation file can be created to automatically perform a specific file transfer. This database might include entries relative to a specific application or group of applications and rules for use with that application or group of applications. Specifically, the database might include entries requiring the transfer of application A along with files X, Y. and Z. An exemplary selection rule for use with such an automation file is: transfer all data files ".aaa" for application A.

The final step in the relocation process is to relocate the selected information from the source to the target machine (step 50). During this step, the specific function selected with respect to each item in selection step 40 is performed. Because some items set to be replaced on the target machine will be in use on the target machine, they cannot be replaced during this step. Instead, a copy of the item is placed in a "staging area," until reboot, whereupon the process is completed.

Figure 2:
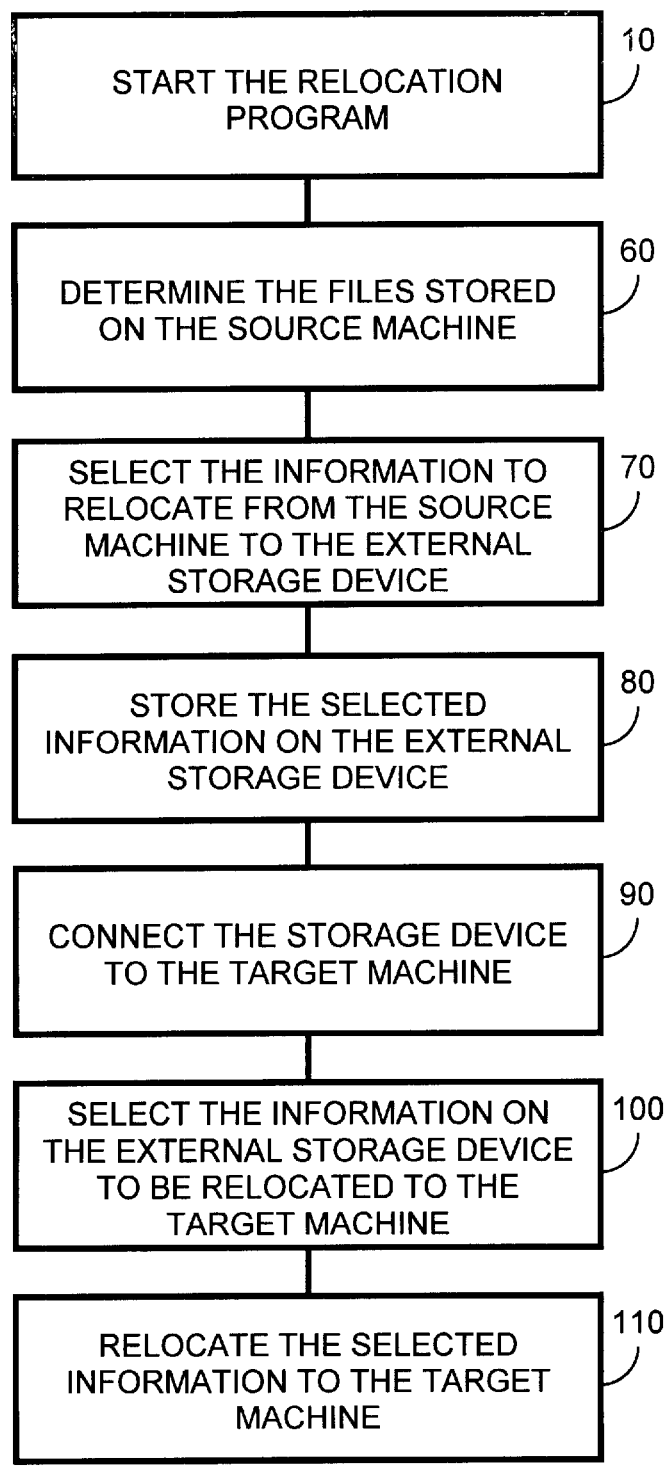
FIG. 2 is a flowchart of an overview of exemplary steps in a second embodiment of a file relocation process.

FIG. 2 shows a second embodiment of the invention for use where a connection between the source and target machines cannot be made. In this arrangement, a storage device is substituted for the electronic connection between the computers. Exemplary storage devices for use as the external storage device are a tape drive or a zip drive. The first step in the process here requires starting the relocation program the source machine (step 10).

Because the source and target machines are not directly connected, a migration application file (MAF) stored on an external storage device takes the place of the connection. Here, the relocation program on the source machine scans the drives of the source machine to create a list of the items on the source machine (step 60). The source machine next performs the selection step of determining which information is to be relocated from the source to the external storage location (step 70). Because this step is performed without knowledge of the identity of the information stored on the target machine, this selection process is less selective than that performed when the machines can be connected, i.e., no comparison between item versions on the source and target drives can be performed. Instead, all of the information stored on the source drive, except for the subset of information that is predefined in the repository database to never be transferred, is copied to the MAF.

The next step in the relocation process is the creation of a MAF by storing the selected information on the storage device attached to the source machine (step 80). In order to conserve space on the storage device, the MAF can take the form of a compressed file on the storage device. The storage device is then connected to the target machine (step 90).

The next step in the relocation process is to select the subset of the information from the MAF to be relocated to the target machine (step 100). The target machine, now connected to the external storage device, performs a selection step as if the external storage device were a source machine. The applications, settings, menus, and data files stored as the MAF on the external storage device are selected for no action to be taken, or to be copied, replaced, or merged onto the target machine. The final step in the relocation process is to relocate the selected information from the external storage device to the target machine (step 110).

In the preferred arrangement of the relocation program of the present invention, the relocation program can perform the relocation processes of FIGS. 1 and 2. If, for example, it is determined that a connection between the machines cannot be completed as required by the first relocation process, then the relocation program could perform instead the second relocation process.

An important consideration to be taken into account when performing a relocation is what to do with the original items on the target machine that are set to be replaced. In accordance with another aspect of the invention, therefore, a backup is made of each item set to be replaced and merged during the relocation process. Further, a relocation log can be created detailing each step in the relocation process. A relocation program user would then be given the option of undoing the entire process at any point during the relocation by using an undo program. Upon selection of the "failsafe undo" command, the relocation program would undo that portion of the relocation process that had been performed to that point by erasing each of the copied items and replacing the merged and replaced items with backup items.

Another consideration is limitations on storage capacity on the target machine. In order to ensure the proper completion of the relocation process in accordance with the present invention, the storage device of the target machine must have adequate capacity to store all of the copied and replaced items along with any items set for backup. Therefore, after the determination of the relocation plan in selection step 40, preferably, the relocation program determines the necessary free capacity on the target machine for completion of the relocation process. Should the relocation program determine that the free capacity on the target machine is inadequate to complete the procedure, a program designed to aid the user in allocating more free space on the target hard drive, such as a "disk space" wizard, could be initiated by the relocation program.

In addition to disk space problems, it may occur that the source machine contains multiple hard drives D: and E: while the destination machine possesses only a single hard drive C:. Four solutions to this problem may be offered by a program called "Drive Letter" wizard. A first solution is to partition the single drive C: on the target machine into three drives C:, D: and E:, and thereafter relocate the items from the D: and E: drives on the source machine to the corresponding D: and E: sector of the C: drive on the target machine.

A second solution to differing drive numbers is to create subfolders on the target drive C:, for example C:\DRIVE_D and C:\DRIVE_E for storing the information from drives D: and E: respectively. The relocation program would then automatically change settings, menus, desktop icons, etc. to refer to the new locations.

A third solution to the problem of differing drive numbers is to relocate all of the selected information from the source drives to the single destination drive of the target machine. This may result in two items to be transferred to the single C: drive having identical names. This can be solved by conflict resolution between the two items, e.g., by renaming one of the items to be stored.

A final solution is to permit the user to de-select one of the multiple drives from the source machine for transfer of information to the target machine. This solution would permit, for example, a user to physically transfer one drive from the source to the target machine while electronically transferring the information from the other drive to the target machine using the relocation program.

The invention also envisions that differing amounts of control of the relocation process be given to the user. For the casual or unsophisticated user, the relocation program would perform the relocation process by minimizing the input necessary from the user. Problems such as inadequate storage capacity would require input from the user, however, the process itself could be performed with little required of the user. This form of relocation program is termed a go button relocation program. Specifically, many consumers do not have the requisite knowledge to make informed decisions about how best to selectively relocate programs, and so providing the opportunity to alter the decisions made by the relocation program would result in frustration or inefficient relocation procedures. Instead, in this arrangement, the relocation makes the best choice and performs the relocation program automatically, unless problems that it is unable to resolve on its own arise.

Alternatively, for more knowledgeable users such as information technology (IT) professionals, the relocation program could display the determined relocation plan to the user for review of the plan, whereby the user could modify the plan by adding or removing items to the list of those to be relocated. The display of information could take the form of a tree, whereby after having scanned the available information on the source machine, the relocation produces a item list in the form of a tree from which individual programs or groups of programs could be selected for relocation by clicking on a checkbox associated therewith. Alternatively a batch command could be issued by the user to selectively alter the relocation process.

In a first arrangement the different levels of review capability given to the user could be provided by a single program, whereby the user would be given the option of choosing the review level they desire. Alternatively a separate "pro" version of the program can be produced having a higher level of functionality for those desiring a greater amount of control of the process.

FIGS. 3–6 show the presently preferred implementation of a relocation process in accordance with the present invention.

Figure 3:
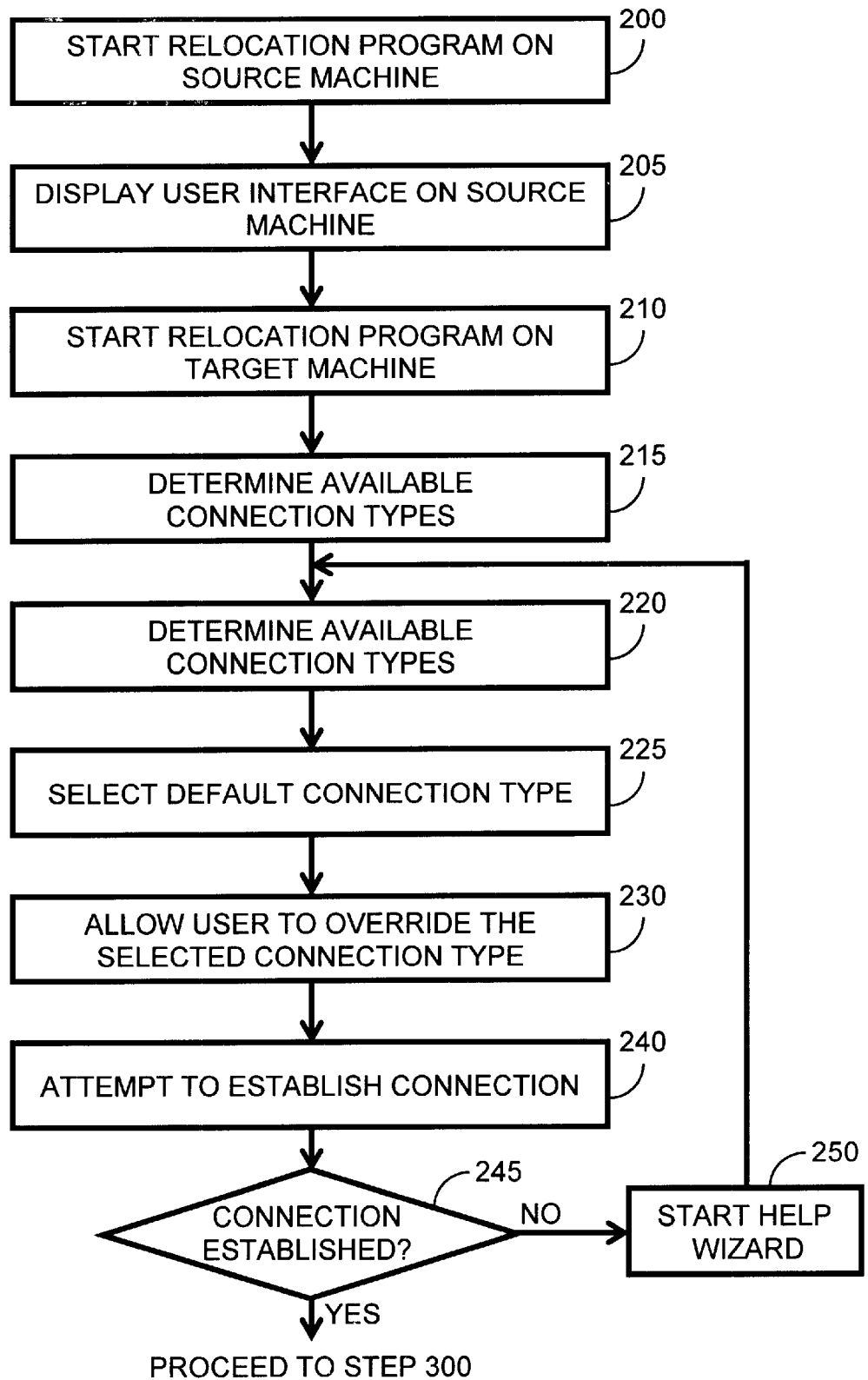
FIG. 3 is a flowchart of exemplary steps in a method of establishing a connection between a source and target machine.

FIG. 3 shows exemplary steps in the establishment of a connection between the source and target computers. The first step in establishing a connection is to start the relocation program on the source computer (step 200). Upon startup, the relocation program will produce an interface screen in order to query the user regarding certain necessary information such as whether the computer is the source or target computer (step 205). Next, the user starts the relocation program on the target computer (step 210). The relocation program then determines the types of connections available (step 215). The relocation program then displays the available connection types (step 220) and defaults to the most appropriate one (step 225). The user is given the option to override the selected connection type (step 230). Next, the relocation program attempts to establish a connection using each selected protocol. The order of preference of connection types can be either pre-programmed or inputted by the user at connection selection step 220 (step 240). The relocation program next determines whether a connection was successfully made (step 245). If the connection was made, the program exits connection step 10. If no connection was made, the program starts a program called a Help Wizard to aid the user in determining why the connection was unsuccessful. The Help Wizard reviews possible problems with the connection and returns the program to step 220 to repeat the connection attempt (step 240).

Figure 4:
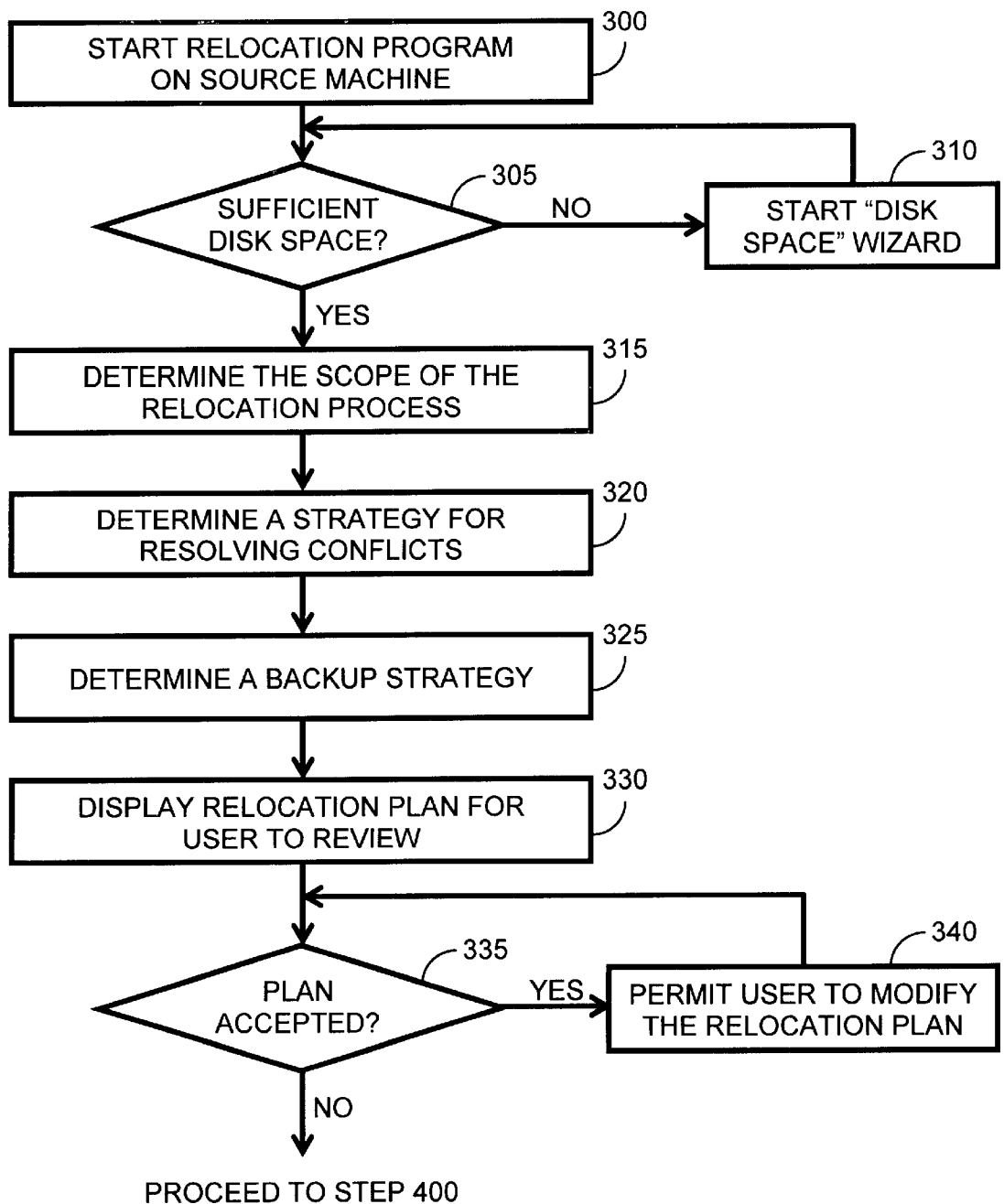
FIG. 4 is a flowchart of exemplary steps in a method of developing a relocation plan.
Figure 5:
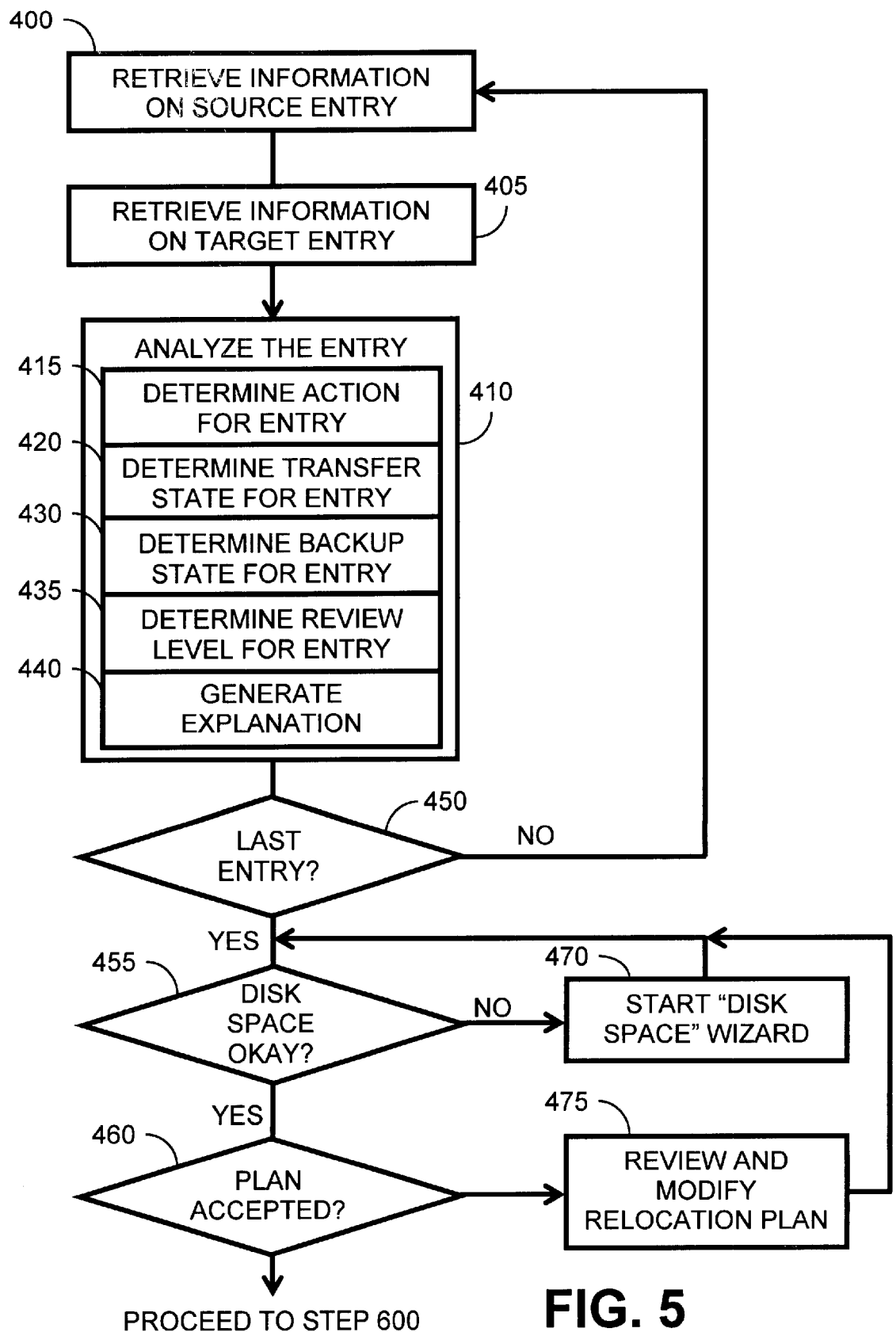
FIG. 5 is a flowchart of exemplary steps in a method of finalizing a relocation plan.

FIGS. 4 and 5 show steps in a preferred embodiment for producing a relocation plan (step 30 of FIGS. 1 and 2). FIG. 4 shows steps in a preferred embodiment of a first sub-step of developing a relocation plan in the production of a relocation plan. FIG. 5 shows steps in a preferred embodiment of a second sub-step of finalizing the relocation plan in the production of a relocation plan.

The first step in the development of a relocation plan is a pre-scan of the source and target machines performed by the relocation program. In conducting the pre-scan of the target computer, the relocation program determines the number of disk drives on the source and target computers, the amount of disk space available on the target computer and the volume of stored data on the source computer (step 300). If incompatibility exists between the number of drives on the source computer and the number of drives on the target computer, the "Drive Letter Wizard" discussed above is initiated. The relocation program next determines whether there is adequate disk space available on the target computer (step 305). If the available disk space on the target computer is inadequate, the relocation program starts a program called a Disk Space Wizard to aid the user in allocating space for the relocated items (step 310).

If the available disk space is adequate, the relocation program proceeds to a determination of whether the relocation is to be partial or complete (step 315). The computer chooses partial or complete relocation depending on the relationship between operating systems. An example of a partial relocation would be to select all settings and documents on the source for transfer, but not transfer the applications and menus. If there are major incompatibilities between the operating systems on the source and target computers, the relocation program will allow only a partial relocation. If there are no major incompatibilities, the relocation program will suggest a complete relocation, but will permit the user to select a partial relocation. The incompatibility of operating systems is a predefined characteristic stored within the database repository in the relocation program based on tests performed on relocations from one operating system to another.

The next step in the development of a relocation plan is to determine a strategy for resolving conflicts between applications on both source and target computer (step 320). Four options are provided for resolving the conflicts: assume that the applications on the target machine are most up-to-date; assume that the applications on the source machine are most up-to-date; make no assumptions but instead flag all items that are dubious; and most appropriate. The present preferred conflict rule is the most appropriate rule, which selects the appropriate item based on version or date when possible. In situations where the program cannot determine using version or date, for example if that information is missing or incorrect, the relocation program will assume that the version of the item on the target machine is to be used.

The next step in the relocation plan is to determine a backup strategy (step 325). The user is given the option to select one or more of a fail-safe undo option, a delayed replacement option and a conserve source items option. The fail-safe undo option produces a backup of the items to be replaced on the target drive. The delayed replacement option delays the replacement of any items on the target machine until reboot. The conserve source items option produces a backup of the items on the source machine that were not selected for relocation from the source machine to the target machine by the relocation process.

Next, the results of the general relocation plan including the results of relocation scope determination step 315, conflict resolution determination step 320 and backup strategy determination step 325 are displayed for review by the user (step 330). The user is given the option of accepting the general relocation plan or overriding the plan (step 335). If the plan is not accepted, the relocation program gives the user the ability to alter the plan (340). The program then loops back to step 330. If the plan is accepted, the program proceeds to the finalization of the relocation plan.

FIG. 5 shows exemplary steps in the finalization of a relocation plan. The first step in the finalization of the relocation plan is to access the information derived from the pre-scan of the source computer (step 400) and the target computer (step 405) from a file containing that information as a list of entries.

The relocation program then individually analyzes information pertaining to each entry (step 410). The step of analyzing each entry includes a number of substeps. The first substep in analyzing an entry is determining the action to be taken with respect to that entry (step 415). The information about each entry will include, for example, its existence, version, date, size, and content. By reviewing the information, the relocation program determines, for example, that a specific file type has been flagged in the repository database as being a taboo system file or directory, such that the item should not be relocated to the target computer. The relocation program then sets an action to be taken for each item among the selected actions of: no action, copy/create directory, replace, and merge. No action might be selected, for example, for a item on the source computer having an older version than that on the target computer. Copy/create directory might be selected, for example, for an application on the source computer where the target computer does not have a version of that application. Replace might be selected, for example, for an application having a newer version on the source computer than the target computer. Merge might be selected, for example, for a directory or setting, wherein some of the data stored in the directory or setting is to be transferred and other data is to remain unchanged.

As noted above, the relocation program includes a repository database of actions to be taken with respect to specific predefined programs. In a first arrangement, each item is compared against the list of items in the repository database to determine if a predefined action has been set with respect to that item. If an action has been set, then no rule is applied to that item. Alternatively, following the application of a rule to a specific item, that item is compared against in the repository database to determine if a predefined action has been set with respect to that item. If an action has been set, the action from the repository database overrides the outcome of the selection rule.

The next substep in the step of analyzing each entry is to set a transfer state for each entry (step 420). Transfer states are either yes (copy or replace), no (no action) or partial (merge). The parenthetical expression after each transfer state refers to the action selected in step 415. The backup state of each entry is then set for each item in view of the backup strategy determined during the development of the relocation plan (step 430).

Next, a review level is selected for each entry, which sets a flag for the user during the procedure of reviewing the finalized relocation plan (step 435). Review levels include, for example, none (no review needed), low (review is optional), medium (review is recommended), high (review is required). Examples of how review levels can be set are: no review would be selected when a item on the source machine has no counterpart on the target machine, a high review level would be selected if the date assigned to a item is illegal, e.g., the creation date is later than the date modified.

The final substep in the analyzing of an entry is the generation of a plain language explanation of the action to be taken with respect to the entry (step 440). An example explanation is "Target file version newer than Source file version . . . ."

Once analyzing step 410 has been performed on each entry (step 450), the relocation program possesses a finalized relocation plan including a specific storage capacity requirement on the target computer. The relocation program checks the available space on the target computer to determine if the available space is sufficient (step 455). If the space is insufficient, the relocation program starts a program to aid in allocating enough space on the target computer to perform the relocation (step 470). After determining that sufficient space is available, the relocation program determines whether the relocation plan has been accepted (step 460). If major issues have arisen during the finalization process or if the user has chosen to review the finalized relocation plan, then the relocation plan is not accepted and the user reviews the relocation program and make changes to the relocation settings for selected entries (step 475). The relocation program then performs the relocation plan.

Figure 6:
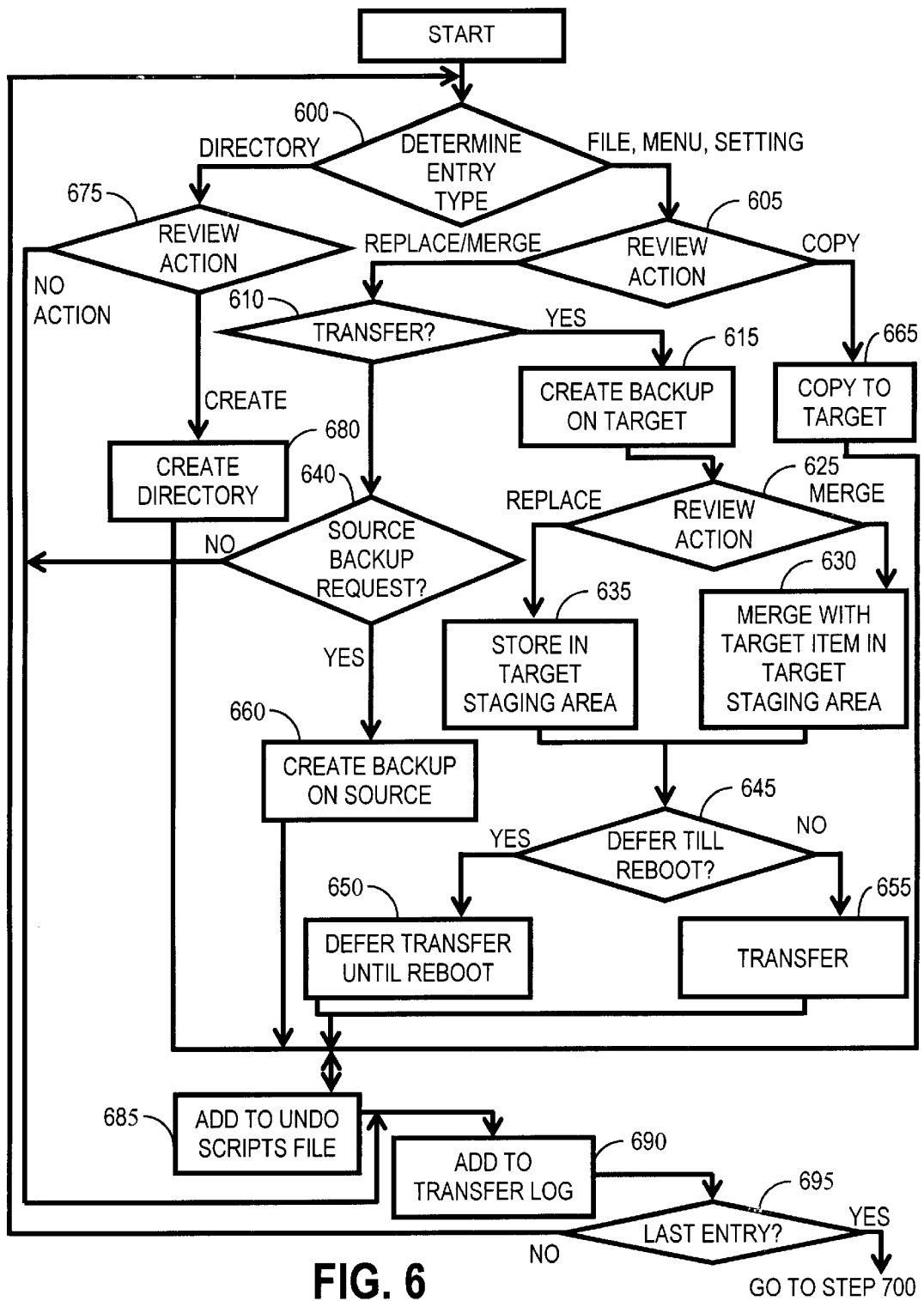
FIG. 6 is a flowchart of exemplary steps in a method of relocating items.

FIG. 6 shows steps in the presently preferred implementation of a process of performing the relocation plan finalized in the process of FIG. 5. The first step in relocation of each entry in the source machine item list is to separate it into a first category if it is a directory or a second category if it is a file, menu, or setting file (step 600). If the entry is a directory, the relocation program next reviews the action to be taken with respect to that item (step 675). If the action is "copy", a new directory is created on the target machine corresponding to the directory on the source machine (step 680). If the action is "no action", no action is taken with respect to that entry. The transfer log is then updated with a notation as to the action taken, wherein "no action" is an action (step 690).

If the entry is a file, menu or setting, the relocation program next determines the action set with respect to that entry (step 605). If the action is "replace" or "merge", the relocation program determines whether the data corresponding to the entry is to be transferred (step 610). If the data is to be transferred, a backup of the original data to be replaced or merged is made on the target machine (step 615). The relocation program next separates the entry into one of two categories based on the action set for that entry (step 625). If the data corresponding to the entry is to be replaced onto the target machine, the data is placed in a staging area on the target machine (step 635). If the data corresponding to the entry is to be merged with corresponding data on the target machine, the two sets of data are merged and placed in a staging area on the target machine (step 630). The relocation program next determines whether the relocation or merge is to be deferred till reboot (step 645). If the relocation or merge is to be deferred, the data remains in the staging area till reboot (step 650). If the relocation or merge is not to be deferred, the data is moved to its final location within memory on the target machine (step 655). The relocation or merge actions taken are then added to an undo scripts file (step 685) and the transfer log (step 690).

If the determination at step 610 was that the entry tagged for relocation or merge is not to be transferred, the relocation program determines whether a request had been made to make a backup of the item on the source machine (step 640). If no backup was requested then the actions taken with respect to the entry are added to the transfer log (step 690). If a backup was requested, the backup is made (step 660) and the actions taken are added to the undo scripts file (step 685) and the transfer log (step 690).

If the action determined at step 605 is "copy", then a copy of the data corresponding to the entry is created on the target machine (step 665). The actions taken with respect to that entry are then added to the undo scripts file (step 685) and the transfer log (step 690).

The above relocation steps are repeated until the relocation program determines that all entries have been processed (step 695).

Figure 7A:
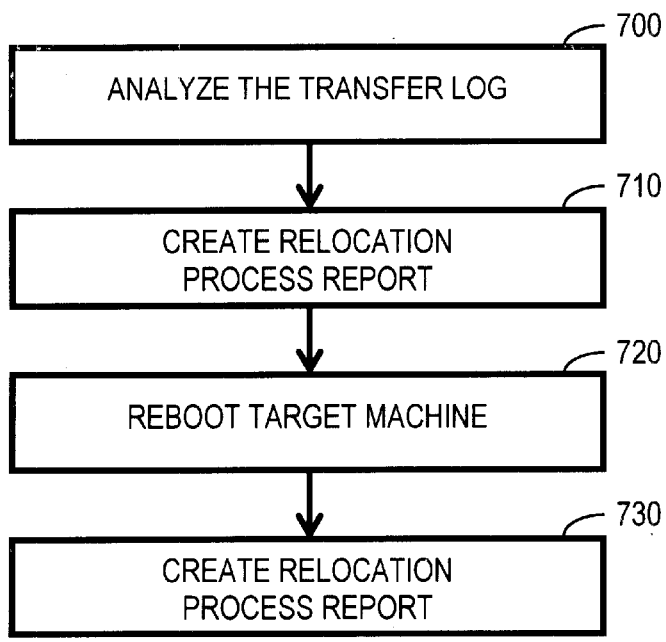
FIG. 7a is a flowchart of exemplary steps in a method of reviewing the relocation procedure.

FIG. 7*a* shows steps in the presently preferred implementation of a process for reviewing the relocation plan carried out in the relocation process of FIG. 6. After all of the entries have been processed, the relocation program analyzes the transfer log (step 700) and creates a relocation process report (step 710). The relocation process report includes information about any problems that occurred during the relocation process along with instructions for the user to resolve those problems. Problems may include communications errors, target disk write errors and situations where the item to be transferred was busy on the source. If no significant problems arose, the report need not be displayed to the user. The next step in the relocation process is to reboot the target machine (step 720). The reboot permits the data corresponding to entries that could not be replaced or merged during the relocation process to be transferred from the staging area into their final storage locations. A second relocation process report is then created (step 730).

Figure 7B:
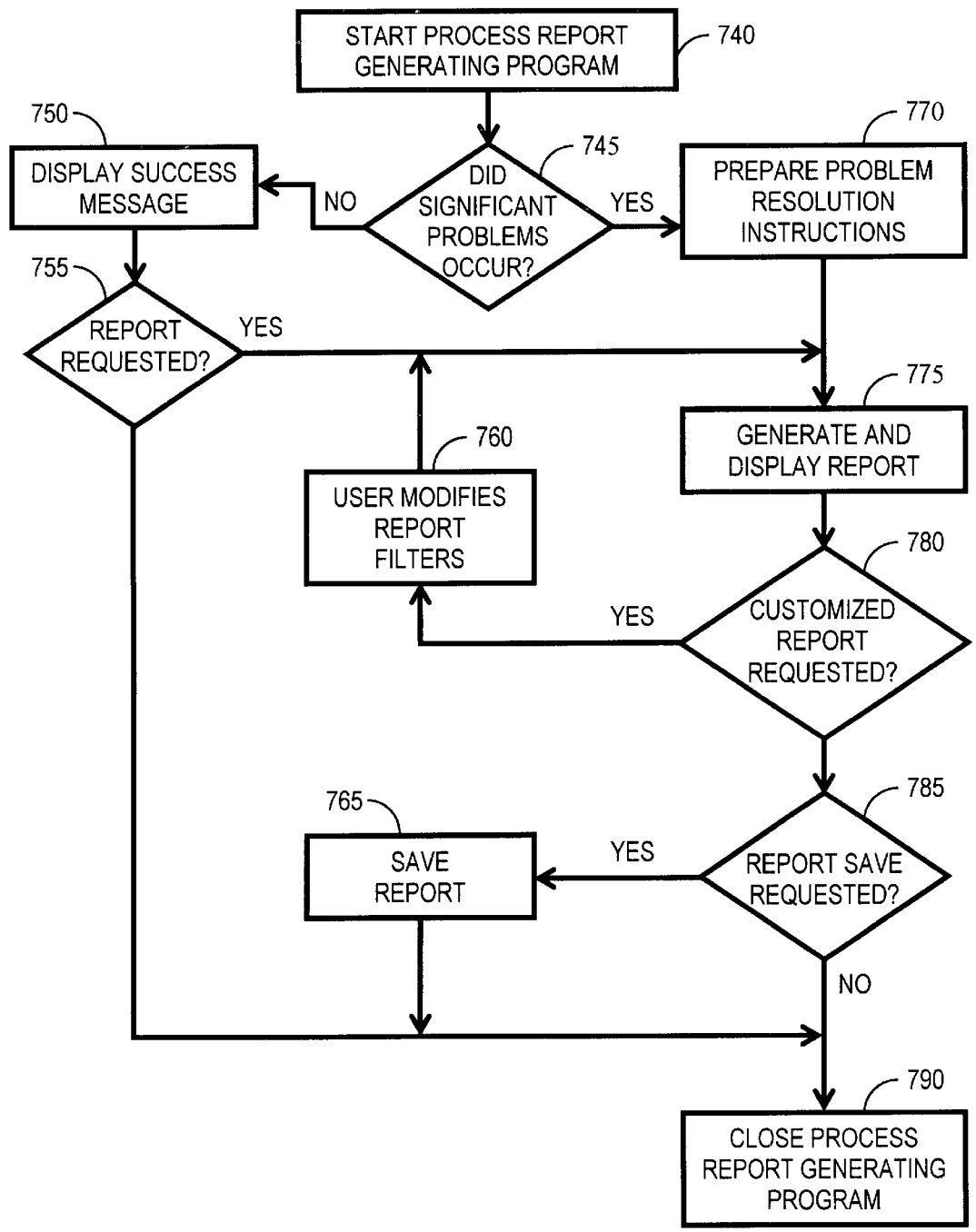
FIG. 7b is a flowchart of exemplary steps in a method of producing a report.

FIG. 7(*b*) shows exemplary steps in a method of generating a process report in accordance with the invention. In the first step of generating a process report, the relocation program starts a process report generating program (step 740). The process report generating program determines if any significant problems arose during the relocation (step 745). If no significant problems occurred, the program displays a "success" message to the user (step 750). The program then queries the user as to whether they would like the program to prepare a report of the transfer process (step 755). If no report is requested, the process report generating program is exited (step 790). If significant problems were found at step 745, the program prepares instructions for resolving the problems (step 770). If a report was requested in step 755 or after the preparation of problem resolution instructions at step 770, the process report generating program generates a report and displays it to the user (step 775). The report will include instructions for resolving problems if applicable.

After the report has been displayed, the user is given the option of customizing the report (step 780). If the user chooses to customize the report, the user is given a selection of options for filtering unwanted data out of the report (step 760). The user, for example, is given the option of selecting a list of errors that occurred during the process, a list of replaced items, a list of created items and a list of items that were not transferred from the source to the destination computer. The choices are organized by directory. Once the user has finished selecting the changes to the report, the process report generating program returns to step 775 to generate a new report.

Once the user is satisfied with the form of the report, i.e., the user chooses not to customize the report at step 780, a query is displayed to the user asking whether the report should be saved (785). If the user chooses to save the report, the report is saved to disk (step 765). After the report is saved or if the user chooses not to save the report, the process report generating program is exited (step 790).

Figure 8:
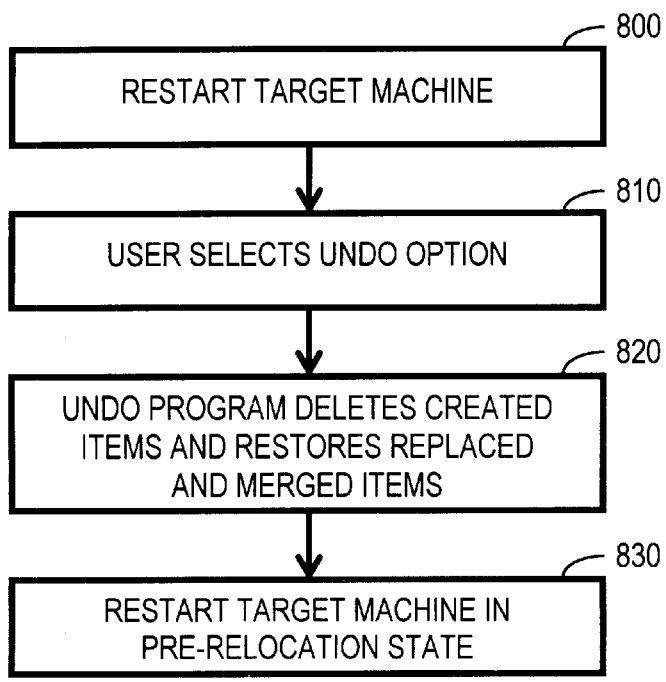
FIG. 8 is a flowchart of exemplary steps in a method of performing an undo after a relocation procedure.

During and after the relocation process, the user is given the option of undoing the relocation process. FIG. 8 shows exemplary steps in a process of undoing a relocation process. The first step in undoing the relocation process is to restart the target computer and the relocation program (step 800). The user then selects the undo function from the relocation program (step 810). Using the undo log as the plan for the undo function, the relocation program deletes each item created on the target computer, and restores each replaced and merged item by replacing that item with the corresponding backup item previously stored (step 820). Any problems that arise during the undo process can be listed in a log of the undo function. Finally, the user restarts the computer, which is now in returned to its original state (step 830).

It will be apparent to those skilled in the art that various modifications and variations can be made in the field of file, application, settings and menu relocation of the present invention without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer program for performing an information transfer between a source computer and a target computer, the source and target computers being connected together, the program performing a method comprising:

selecting information for transfer from the source computer to the target computer by comparing stored information from the source computer to stored information from the target computer; and transferring the selected information from the source computer to the target computer;

wherein the step of comparing includes selecting items to be copied from the source computer to the target computer, selecting items on the target computer to be replaced with items from the source computer, and selecting items from the target computer to be merged with items from the source computer; and wherein merging includes replacing user specific settings on the target computer with corresponding user specific settings on the source computer.

2. The program of claim 1, wherein the program, upon selection of an undo command, uses the created backup items to return the target computer to a pre-transfer state.

3. The program of claim 1, wherein said settings are transferred only if they are compatible with said target computer.

4. The program of claim 1, wherein the hardware of said source computer and said target computer is incompatible.

5. A computer migration program for migrating the essence of a source computer to a target computer coupled thereto, said program performing the steps of:

selecting information for transfer from the source computer to the target computer by comparing stored information from the source computer to stored information from the target computer; and transferring the selected information from the source computer to the target computer;

wherein said target computer is adapted to supersede said source computer;

wherein the step of comparing includes selecting items to be copied from the source computer to the target computer, selecting items on the target computer to be replaced with items from the source computer, and selecting items from the target computer to be merged with items from the source computer; and wherein merging includes retaining hardware specific settings on the target computer.

6. A computer program for performing a transfer between a source computer and a target computer, the program performing a method comprising:

storing information from the source computer as a migration application file on an external storage device;

selecting information from transfer from the migration application file to the target computer by comparing stored information from the migration application file to stored information from the target computer; and transferring the selected information from the migration application file to the target computer;

wherein the step of comparing includes selecting items to be copied from the source computer to the target computer, selecting items on the target computer to be replaced with items from the source computer, and selecting items from the target computer to be merged with items from the source computer; and wherein merging includes replacing user specific settings on the target computer with corresponding user specific settings on the source computer.

7. The program of claim 6, wherein said settings are transferred only if they are compatible with said target computer.

8. The program of claim 6, wherein the hardware of said source computer and said target computer is incompatible.

9. A computer migration program for migrating the essence of a source computer to a target computer, said, program performing the steps of:

storing information from the source computer as a migration application file on an external storage device;

selecting information from transfer from the migration application file to the target computer by comparing stored information from the migration application file to stored information from the target computer; and transferring the selected information from the migration application file to the target computer;

wherein said target computer is adapted to supersede said source computer;

wherein the step of comparing includes selecting items to be copied from the source computer to the target computer, selecting items on the target computer to be replaced with items from the source computer, and selecting items from the target computer to be merged with items from the source computer; and wherein merging includes retaining hardware specific settings on the target computer.

* * * * *